(12) United States Patent
Warke et al.

(10) Patent No.: US 12,366,642 B2
(45) Date of Patent: Jul. 22, 2025

(54) METHODS AND APPARATUS FOR LIDAR OPERATION WITH SEQUENCING OF PULSES

(71) Applicant: TEXAS INSTRUMENTS INCORPORATED, Dallas, TX (US)

(72) Inventors: Nirmal C. Warke, Saratoga, CA (US); David P. Magee, Allen, TX (US); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 679 days.

(21) Appl. No.: 16/835,432

(22) Filed: Mar. 31, 2020

(65) Prior Publication Data

US 2020/0292681 A1 Sep. 17, 2020

Related U.S. Application Data

(63) Continuation of application No. 15/485,147, filed on Apr. 11, 2017, now Pat. No. 10,613,204.

(Continued)

(51) Int. Cl.
*G01S 7/4911* (2020.01)
*G01S 7/484* (2006.01)
(Continued)

(52) U.S. Cl.
CPC ............ *G01S 7/4911* (2013.01); *G01S 7/484* (2013.01); *G01S 7/487* (2013.01); *G01S 7/493* (2013.01); *G01S 17/10* (2013.01); *G01S 17/36* (2013.01)

(58) Field of Classification Search
CPC ...... G01S 17/89; G01S 17/894; G01S 7/4808; G01S 7/4865
See application file for complete search history.

(56) References Cited

U.S. PATENT DOCUMENTS

| | | | |
|---|---|---|---|
| 5,027,122 A | * | 6/1991 | Wieler ................. G01S 13/227 342/26 D |
| 5,226,847 A | | 7/1993 | Thomas, III et al. |

(Continued)

FOREIGN PATENT DOCUMENTS

| | | |
|---|---|---|
| EP | 1055941 | 11/2000 |
| EP | 2963445 | 6/2016 |

OTHER PUBLICATIONS

Baltsavias E.P., "Airbone laser scanning: basic relations and formulas" ISPRS J Photogramm Remote Sens (1999) 54:199-214. doi:10.1016/S0924-2716(99)00015-5 Elsevier B.V., Radarweg 29, 1043 NX Amsterdam, The Netherlands, accessed Apr. 11, 2017: http://www2.geog.ucl.ac.uk/~mdisney/teaching/teachingNEW/PPRS/papers/Baltsavias_Lidar.pdf.

(Continued)

*Primary Examiner* — Luke D Ratcliffe
(74) *Attorney, Agent, or Firm* — Michelle F. Murray; Frank D. Cimino

(57) ABSTRACT

Described example aspects include an integrated circuit includes a timing controller configured to select a selected time slot in a measurement period having a plurality of time slots and a transmit driver configured to provide a transmit signal in accordance with the selected time slot, in which the transmit signal is transmitted to an optical transmitter. The integrated circuit also includes a range estimator configured to receive a received signal after the selected time slot from an optical receiver that is configured to receive a reflection of light transmitted by the optical transmitter off an object, the range estimator configured to determine an estimated distance of the object based on the received signal.

19 Claims, 4 Drawing Sheets

Related U.S. Application Data

(60) Provisional application No. 62/334,117, filed on May 10, 2016.

(51) Int. Cl.
  *G01S 7/487* (2006.01)
  *G01S 7/493* (2006.01)
  *G01S 17/10* (2020.01)
  *G01S 17/36* (2006.01)

(56) References Cited

U.S. PATENT DOCUMENTS

| | | |
|---|---|---|
| 5,525,996 A | 6/1996 | Aker et al. |
| 5,742,379 A | 4/1998 | Reifer |
| 5,745,437 A | 4/1998 | Wachter et al. |
| 5,784,023 A | 7/1998 | Bluege |
| 5,889,490 A | 3/1999 | Wachter et al. |
| 6,369,880 B1 | 4/2002 | Steinlechner |
| 6,522,395 B1 | 2/2003 | Bamji et al. |
| 7,262,402 B2 | 8/2007 | Niclass et al. |
| 7,512,237 B1 | 3/2009 | Schantz et al. |
| 7,701,559 B2 | 4/2010 | Bridges et al. |
| 2002/0176067 A1 | 11/2002 | Charbon |
| 2004/0105087 A1 | 6/2004 | Gogolla et al. |
| 2004/0129478 A1* | 7/2004 | Breed ............... B60R 21/01534 |
| | | 180/273 |
| 2004/0246171 A1 | 12/2004 | Orr et al. |
| 2009/0059201 A1 | 3/2009 | Willner et al. |
| 2010/0026984 A1 | 2/2010 | Lewis |
| 2010/0027602 A1 | 2/2010 | Abshire et al. |
| 2010/0045965 A1* | 2/2010 | Meneely ................. G01S 17/10 |
| | | 356/5.01 |
| 2015/0312554 A1 | 10/2015 | Banks et al. |
| 2016/0003946 A1* | 1/2016 | Gilliland ................. G01S 17/10 |
| | | 356/5.01 |
| 2016/0025843 A1 | 1/2016 | Sebastian et al. |
| 2016/0047891 A1 | 2/2016 | Campbell et al. |
| 2016/0223588 A1 | 8/2016 | Fox |
| 2016/0231420 A1 | 8/2016 | Kryvobok |
| 2016/0291138 A1* | 10/2016 | Drader .................. G01S 7/4863 |
| 2017/0082737 A1 | 3/2017 | Slobodyanyuk et al. |

OTHER PUBLICATIONS

"Chung et al., "Optical Orthogonal Codes: Design, Analysis, and Applications," IEEE Trans on Information Theory, vol. 35. No 3, May 1989, IEEE, 445 Hoes Lane, Piscataway, NJ 08854-4141 USA; accessed Apr. 11, 2017 http://www.math.ucsd.edu/~fan/mypaps/fanpap/97_opticalorthocodes.pdf".

* cited by examiner

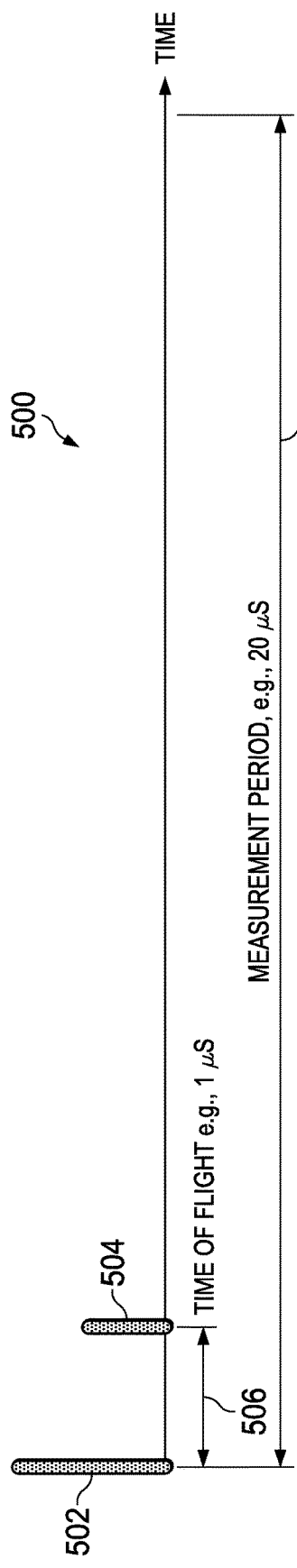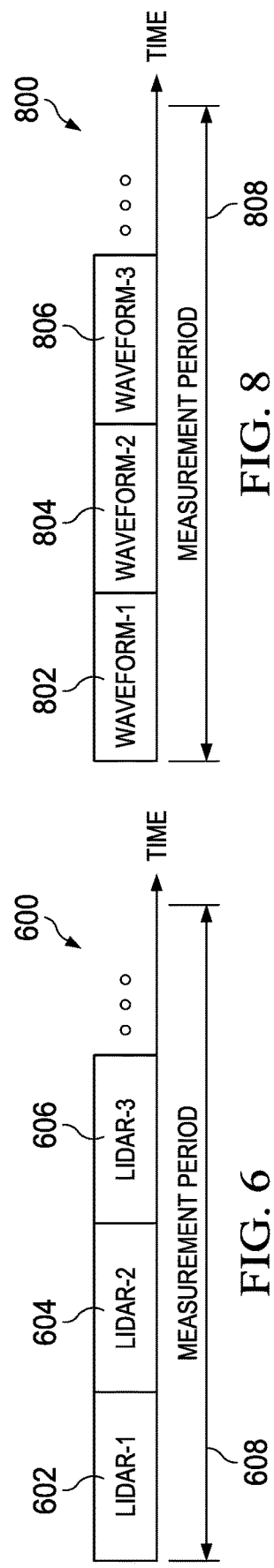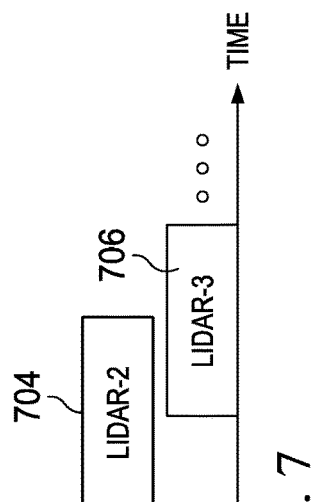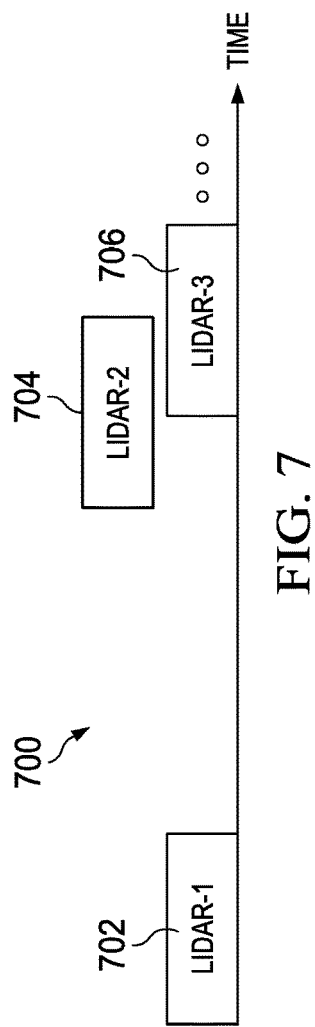

METHODS AND APPARATUS FOR LIDAR OPERATION WITH SEQUENCING OF PULSES

CROSS-REFERENCE TO RELATED APPLICATIONS

This application is a continuation of U.S. patent application Ser. No. 15/485,147, filed Apr. 11, 2017, which claims the benefit of U.S. Provisional Application No. 62/334,117, filed May 10, 2016, each of which is incorporated by reference in its entirety herein. In addition, this application is related to U.S. application Ser. No. 15/396,457, filed Dec. 31, 2016, which claims the benefit of U.S. Provisional Application Ser. No. 62/334,098, filed May 10, 2016, and this application is related to U.S. application Ser. No. 15/484,975, filed Apr. 11, 2017, which claims the benefit of U.S. Provisional Application Ser. No. 62/334,107, filed May 10, 2016, each of which is incorporated by reference in its entirety herein.

TECHNICAL FIELD

This disclosure relates generally to lidar, and, in particular, to preventing interference between lidar devices.

BACKGROUND

Lidar is a ranging technology used to estimate distance to a target based on transmitting light energy. Typical lidar systems operate by reflecting a transmitted narrow pulse of light off a target and estimating the amount of time it takes the pulse to return. An alternative approach is amplitude modulated continuous wave (AMCW) based lidar. In AMCW lidar, the transmitter modulates the intensity of the light with a continuous wave (CW) signal. The receiver typically estimates the time of flight based on the phase of the received CW signal relative to the transmitted CW signal.

As noted hereinabove, lidar (also called LIDAR, LiDAR, and LADAR) is a method for measuring distance to a target by illuminating that target with a laser light. The name lidar is sometimes considered an acronym of Light Detection And Ranging or Light Imaging, Detection, And Ranging. Lidar was originally a portmanteau of the words "light" and "radar." In lidar systems, a source transmits light into a field of view and the light reflects off objects. Sensors receive the reflected light. In some lidar systems, a flash of light illuminates an entire scene. In such flash lidar systems, arrays of time-gated photodetectors receive reflections from objects illuminated by the light, and the time it takes for the reflections to arrive at various sensors in the array is determined. In an alternative approach, a scan such as a raster scan can illuminate a scene in a continuous scan fashion. A source transmits light or light pulses during the scan. Sensors that can also scan the pattern, or fixed sensors directed towards the field of view, receive reflective pulses from objects illuminated by the light. The light can be a scanned beam or moving spot. Time-of-flight computations can determine the distance from the transmitter to objects in the field of view that reflect the light. The time-of-flight computations can create distance and depth maps. Light scanning and lidar applications include: ranging; metrology; mapping; surveying; navigation; microscopy; spectroscopy; object scanning; and industrial applications. Recently, lidar applications also include: security; robotics; industrial automation; and mobile systems. Vehicles use lidar navigation and collision avoidance systems. Autonomous vehicles and mobile robots use lidar for collision avoidance and scene detection.

Lidar systems operating in the same environment may interfere with one another, as there is no way for each lidar system to discriminate its return signal from that of other lidar systems. In industrial environments, more than one robot or other device may be employing lidar. In automotive applications, other vehicles may be using lidar in the same area. Interference between lidar systems can result in erroneous operation. In safety critical applications, such as automotive or industrial applications, this type of operational malfunction is not acceptable.

SUMMARY

In accordance with an example embodiment, an integrated circuit includes a timing controller configured to select a selected time slot in a measurement period having a plurality of time slots and a transmit driver configured to provide a transmit signal in accordance with the selected time slot, in which the transmit signal is transmitted to an optical transmitter. The integrated circuit also includes a range estimator configured to receive a received signal after the selected time slot from an optical receiver that is configured to receive a reflection of light transmitted by the optical transmitter off an object, the range estimator configured to determine an estimated distance of the object based on the received signal.

BRIEF DESCRIPTION OF THE DRAWINGS

FIG. 5 is a graph illustrating a relationship between an example time of flight and an example measurement period.

FIG. 6 is a graph illustrating the operation of an embodiment.

FIG. 7 is a graph illustrating the operation of another embodiment.

FIG. 8 is a graph illustrating the operation of still another embodiment.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
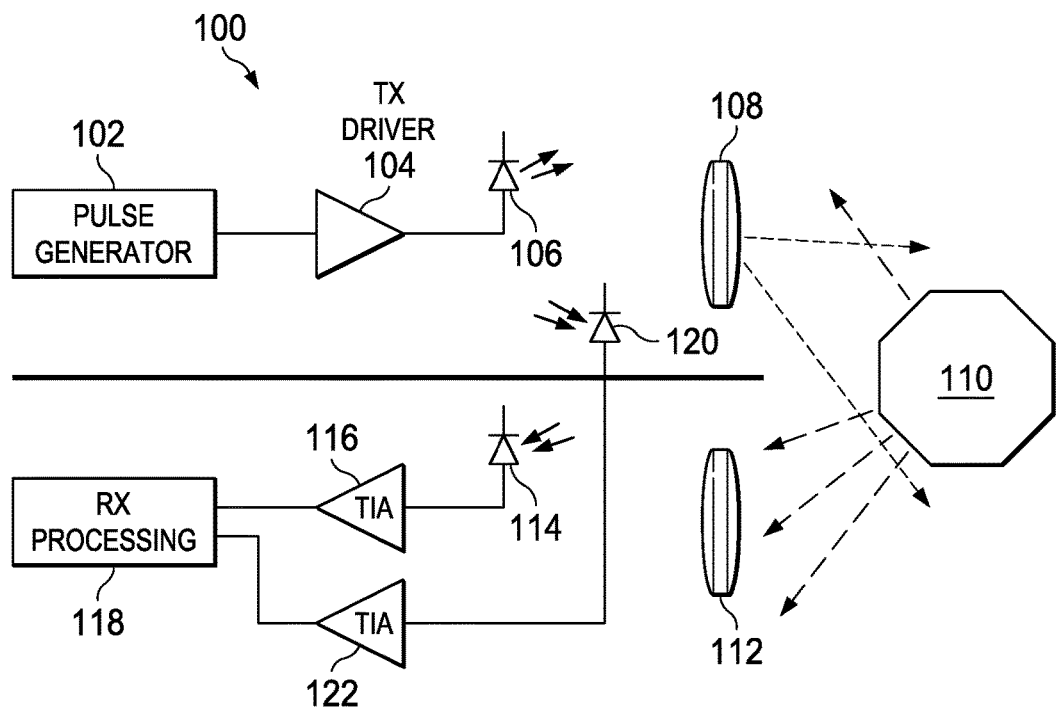
FIG. 1 is a block diagram of a pulse-type lidar.

FIG. 1 is a block diagram of a pulse-type lidar. Lidar 100 includes pulse generator 102, which provides timed pulses to transmit driver 104. Transmit driver 104 drives laser diode 106. Optics 108 collimates and directs the pulsed light onto a field of view that includes object 110. Optics 108 may be a fixed lens system or one of many mechanisms for scanning the light signal across a scene. Object 110 reflects and scatters the light signal. Optics 112 receives a portion of the reflected light signal and focuses it on photodiode 114. Trans-impedance amplifier (TIA) 116 amplifies the output of photodiode 114 and provides the amplified signal to receive processing unit 118. In some configurations, a photodiode 120 is positioned to receive a portion of the light signal directly from laser diode 106. TIA 122 amplifies the output of photodiode 120 and provides the output to receive processing unit 118. Receive processing unit 118 includes analog-to-digital converters (ADCs, not shown) that convert the signals received from TIA 116 and TIA 122 to digital format for further processing as described hereinbelow regarding FIG. 2.

Figure 2:
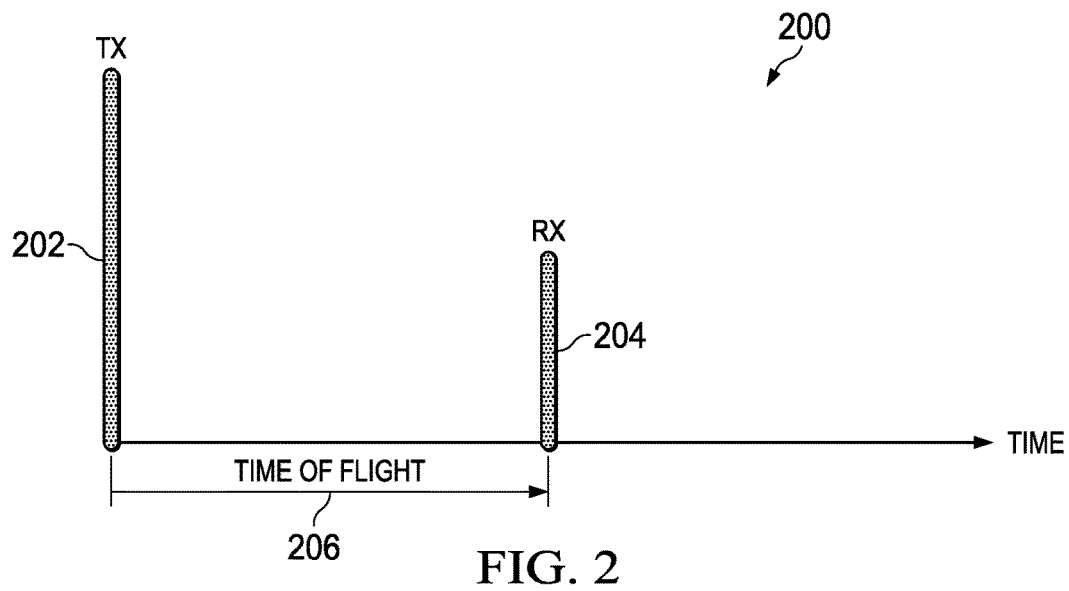
FIG. 2 is a signal graph showing the operation of the lidar of FIG. 1.

FIG. 2 is a signal graph showing an example operation of lidar 100 of FIG. 1. Graph 200 shows transmit pulse 202 at a first time followed by receive pulse 204. The speed of light is known, so the distance of object 110 (FIG. 1) from the transmitter can be estimated using time of flight 206. That is, the distance is estimated as given in Equation 1:

$$d=(c*t_{TOF})/2 \qquad (1)$$

Where: d is the distance, c is the speed of light and $t_{TOF}$ is the time of flight. The speed of light times the time of flight is halved to account for the travel of the light pulse to, and from, the object.

Receive pulse 204 has significantly smaller amplitude than transmit pulse 202. The difference between the amplitudes of the transmit pulse and the receive pulse in an application is much greater than the examples shown in FIG. 2. The reduced amplitude in the received pulse is due to the scattering, absorption and divergence of the transmitted light. Therefore, it is sometimes difficult to discriminate between the receive pulse 204 and noise. In addition, the losses during flight make it necessary to use powerful lasers to ensure that the receiving photodiode receives a pulse of adequate amplitude.

Figure 3:
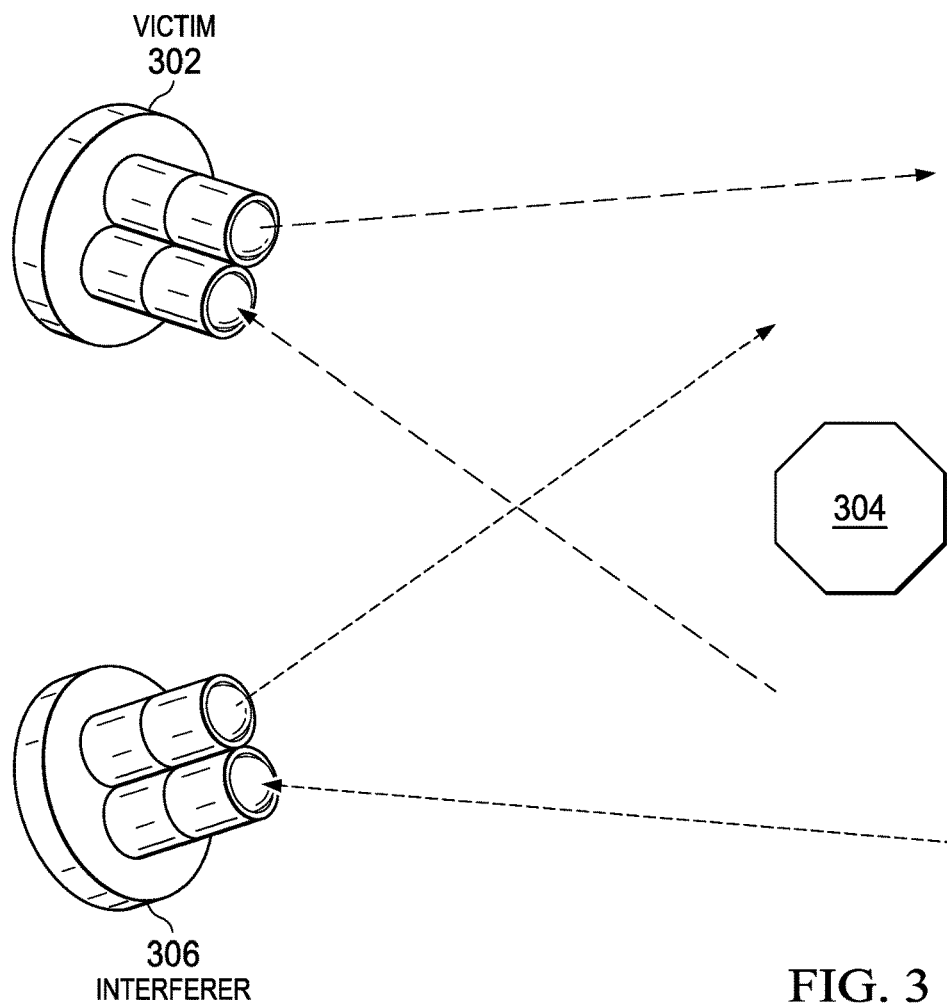
FIG. 3 illustrates an additional problem with lidar systems.

FIG. 3 illustrates an additional problem with the device of FIG. 1. If multiple lidars are operating in the same environment, it is not possible to discriminate between an intended return pulse (like receive pulse 204, FIG. 2) and a return pulse from another lidar. For example, in FIG. 3 victim lidar 302 is attempting to range object 304. However, interferer lidar 306 is also attempting to range object 304. Victim lidar 302 has no way to determine that a received pulse is a return from the pulse transmitted by itself or is a return from interferer lidar 306. A time of flight calculated from any received input other than the proper receive pulse produces an erroneous distance estimate.

Figure 4:
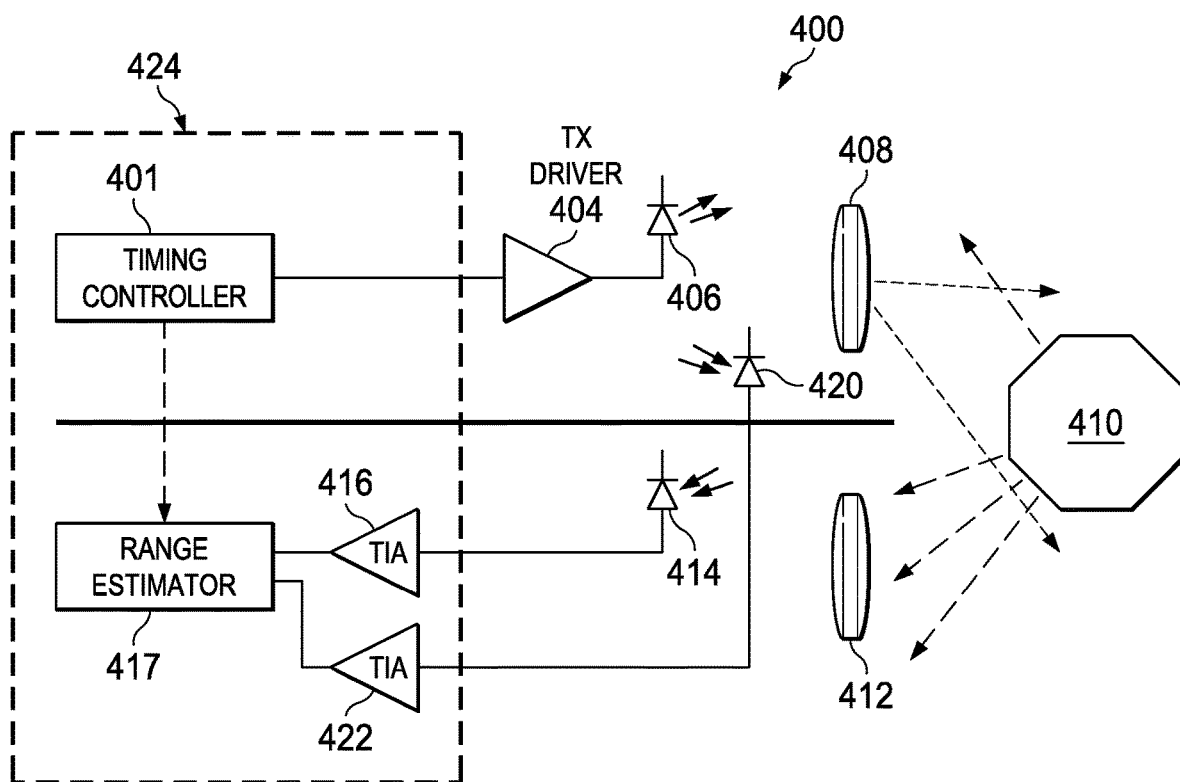
FIG. 4 is a block diagram of an embodiment lidar system.

FIG. 4 is a block diagram of an embodiment for a lidar system. Lidar 400 includes timing controller 401, which controls the time slot in which lidar 400 operates (as further explained hereinbelow). Timing controller 401 sends a transmit signal to transmit driver 404 indicating when transmit driver 404 can send a driving signal to an optical transmitter, such as laser diode 406. Laser diode 406 transmits a light pulse in response to the driving signal. Optics 408 directs the light pulse to object 410. Optics 408 may be a fixed lens system. In an alternative the optics 408 can include one of many mechanisms for scanning the light signal across a scene.

Optics 412 focuses a reflection of the light pulses reflected by object 410 onto an optical receiver, such as photodiode 414. In addition, optional photodiode 420 receives a reference light signal directly from laser diode 406. TIAs 416 and 422 amplify the light signals received by photodiodes 414 and 420, respectively, and provide these signals to range estimator 417.

Range estimator 417 compares the received pulses provided from TIAs 416 and 422 to determine an estimated distance of the object 410. Range estimator 417 only compares the output of TIAs 416 and 422 after the time slot assigned to lidar 400 (as further explained hereinbelow). In an embodiment, TIAs 416 and 422 and the analog front end (AFE) components in range estimator 417 are the same or similar. This architecture allows range estimator 417 to factor out common noise and non-linearities by comparing the two signals.

Timing controller 401, transmit driver 404, range estimator 417 and TIAs 416 and 422 may be partially or wholly incorporated into an integrated circuit as indicated by group 424. For example, an integrated circuit may generate the signals and apply the signals to laser diode 406 using one or more power transistors or power modules. Transmit driver 404 may be discrete components or several components incorporated into a module. In some configurations, one integrated circuit may drive multiple laser diodes. In other configurations, a separate circuit drives each of multiple laser diodes and a common range estimator 417 analyzes the signals. The range estimator 417 may include a digital signal processor, a RISC core such as an ARM core (a product of ARM, Ltd.) or another suitable processor.

FIG. 5 is a signal graph illustrating the relationship between an example time of flight and an example measurement period in an operation of an embodiment. The measurement rate is the number of times in each period that the lidar takes a measurement. The measurement rate for most lidars is under 50 kHz. That is, a lidar with a 50 kHz measurement rate takes 50,000 measurements per second. This rate is very fast as compared to robotics and industrial applications. For example, measurement rates for these type of applications are usually on the order of 1 kHz. In contrast, the time of flight is much shorter because the light travels at approximately $3\times10^8$ m/s. For example, a very long measurement of 150 m requires about 1 µS ((2*150 m)/($3\times10^8$ m/s)). FIG. 5 shows that even with a very long time of flight and a very fast measurement rate, the measurement period is many times the time of flight. Time of flight 506 is the difference between transmit pulse 502 and receive pulse 504. The measurement period 508 with a measurement rate of 50 kHz is 20 µS (1/50 kHz). Thus, graph 500 shows that even with a very long time of flight 506 and a very short measurement period 508, the measurement period is twenty times longer than the time of flight.

FIG. 6 is a signal graph illustrating an operation of an embodiment. Because the measurement period 608 is much longer than the time of flight, a plurality of time slots 602, 604, 606 and so on divide the measurement period 608. The number of possible time slots is equal to the measurement period divided by the time of flight. In practice, the time of flight includes buffer time to avoid interference between time slots. Graph 600 shows three time slots. However, this configuration is only for simplicity of illustration. For example, in an industrial application, the measurement rate can be approximately 1 kHz. The maximum measurement range can be 15 m. With these assumptions, the time of flight is about 100 nS and the measurement period is about 1 mS. Thus, with this example configuration, a maximum of 10,000 slots are available. A common control, such as a computer, (not shown) defines the clock and the time periods and communicates a time slot to timing controller 401 of lidar 400 (FIG. 4) using an assignment signal. The communication link from the common control may communicate with lidar 400 using any number of media such as wired links, optical links or RF links. By assigning one time slot to one lidar, no interfering lidar, such as interferer lidar 306, is possible because only one lidar may transmit during one time slot and the time slot includes enough time to ensure that the return pulse arrives before that time slot ends. Thus, the operation of each lidar is orthogonal in time to the other lidars operating in the same environment.

FIG. 7 is another signal graph illustrating an example operation of another embodiment. Graph 700 illustrates an embodiment where there is no synchronization between lidars and/or common control. Rather, in the example of FIG. 7, each lidar picks a slot at random. In one aspect of this embodiment, each lidar includes a pseudo-random number generator in timing controller 401 (FIG. 4). With each measurement, lidar 400 (FIG. 4) selects a time slot 602, 604, 606, (FIG. 6) based on the pseudo-random number generated. With a large number of time slots, the probability of two lidars selecting the same time slot (a "collision") using this pseudo-random number based system is very low. However, it is possible. Graph 700 shows that lidar-1 702 has selected a slot with no interference. On the other hand, lidar-2 704 and lidar-3 706 have selected the same time slot. In this case, lidar-2 704 and lidar-3 706 will receive two return pulses: one correct and one interfering.

The presence of an interfering return pulse can be detected as an "outlier." With measurements occurring at least every 1 mS, the distance a measured object can travel between measurements is small. For example, if the distance of an object is different by 1 m between measurements, this example implies that the object is traveling at 1 m/0.001 S=1,000 m/s (2,237 mph). In the absence of a very strong explosion, this result is not a reasonable measurement. Modeling and experimentation can determine the actual parameters for detecting outliers. In the rare event that two lidars utilizing the embodiment approaches randomly pick the same time slot, the conflicting lidars can reject these measurements using outlier detection.

FIG. 8 is another signal graph illustrating an example operation of another embodiment. In graph 800, a plurality of time slots 802, 804, 806, etc. divide the measurement period 808. A common control (not shown) assigns the time slots 802, 804, 806, etc. as described regarding FIG. 6. In another configuration, lidar 400 (FIG. 4) selects a time slot from among the available time slots 802, 804, 806, etc. using a pseudo-random number generator, as described regarding FIG. 7. However, in the embodiment of FIG. 8, laser diode 406 (FIG. 4) transmits a continuous wave signal during the time slot. Photodiode 414 receives the reflection of the continuous wave transmitted by laser diode 406 and determines the time of flight by measuring the phase difference between the transmitted and received signals. The range estimator 417 (FIG. 4) receives the transmitted signal directly from timing controller 401 (FIG. 4) or from photodiode 420 (FIG. 4) via TIA 422 (FIG. 4). Some overlap may occur between the reflected signal and a subsequent time slot. Therefore, additional buffer time may be added to the time slot and the measurement may be limited to the later part of the time slot when such reflections have dissipated. In addition, because the waveform consists of multiple cycles of the modulation signal, the total transmit energy is divided amongst the multiple cycles resulting in lower peak transmit optical power. Thus, laser diode 406 and transmit driver 404 can be cheaper and more compact than those used in prior systems. In addition, photodiode 414 may be implemented using a p-type-intrinsic-n-type (PiN) photodiode, an avalanche photodiode (APD) or a silicon photomultiplier (SiPM).

Figure 9:
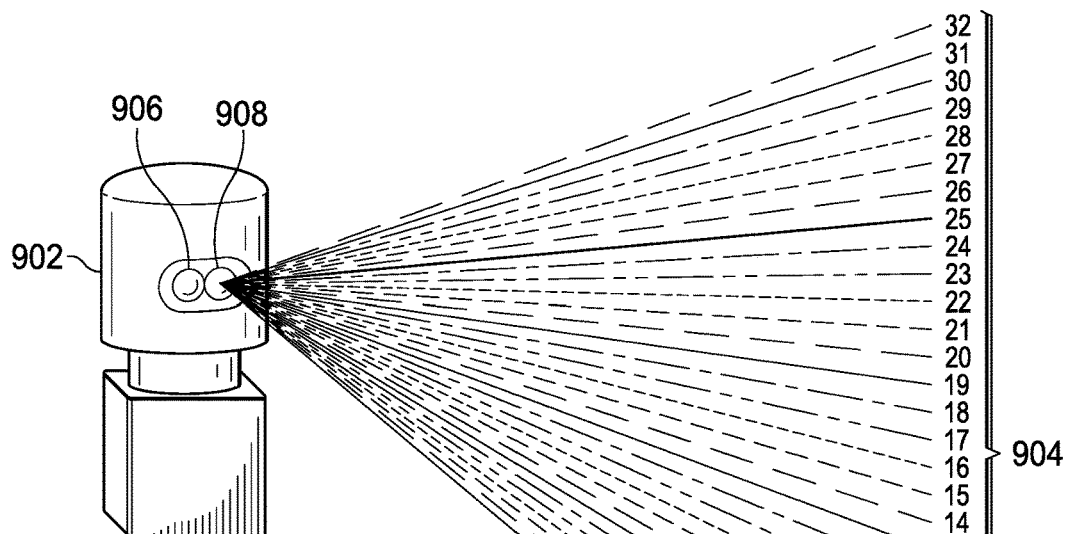
FIG. 9 is a drawing of a lidar device with scanning capabilities.

FIG. 9 is a drawing of a lidar device with scanning capabilities. Lidar scanner 902 includes transmitter 908 and receiver 906. The optics of transmitter 908 (not shown) allow the laser pulse to be directed in a plurality of beams 904. The optics may include movable mirrors, digital micromirror devices (DMDs), movable prisms or other beam direction devices. In other implementations, separate laser transmitters transmit each of beams 904. Lidars like lidar scanner 902 sometimes use rotating mounts to allow for scanning an entire scene.

Using a system like that of FIG. 1, each of the plurality of beams 904 must allow for the time of flight for the maximum range of the device. If a second transmission transmits before the return of the first transmission, the receiving photodiode may pick up a reflection of the second transmission or scatter from the second transmission. Either one could cause an erroneous distance estimate. Therefore, each subsequent transmission must delay until it is certain that such a conflict will not occur, i.e. the time of flight for the maximum range of the device. Using an embodiment like that of FIG. 4, a time slot can be provided for each beam. Therefore, using an embodiment like that of FIG. 4, a lidar such as lidar scanner 902 may transmit any of beams 904 as soon as the time slot is available without interference between beams. Use of the embodiments thus allows for much faster scanning.

Figure 10:
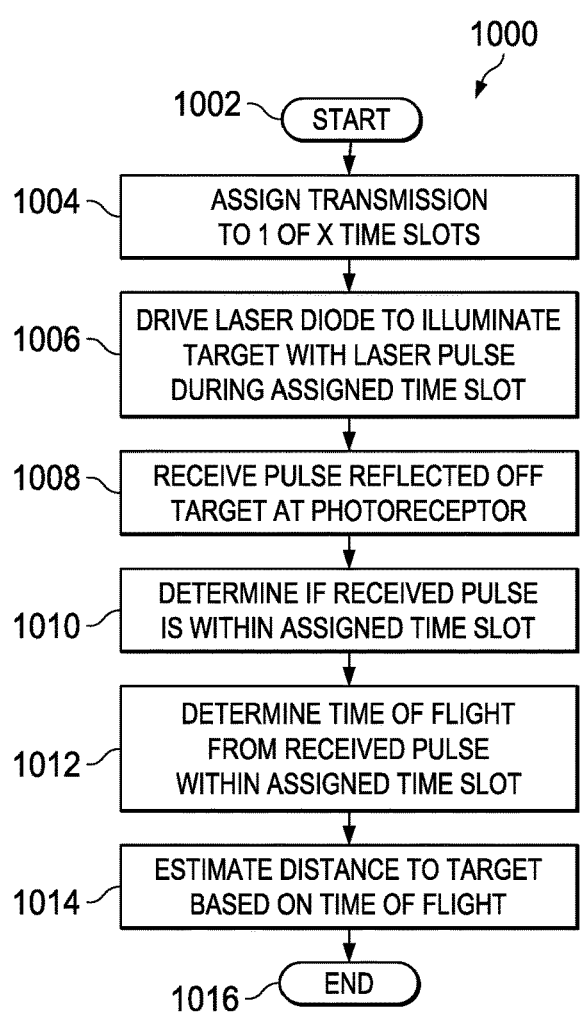
FIG. 10 is a flow diagram of an embodiment method.

FIG. 10 is a flow diagram of an embodiment method. Method 1000 starts with step 1002. Step 1004 assigns a lidar transmission to one of X available time slots (as described hereinabove). Step 1006 drives a laser diode (406, FIG. 4) to illuminate that target after the assigned time slot. Step 1008 receives the pulse reflected off the target after the assigned time slot. Step 1010 compares the received signal to the transmitted signal to determine the time of flight. The transmit signal of step 1010 may be provided by a monitoring photodiode, such as photodiode 420 (FIG. 4), or by providing a sync signal timing controller 401 (FIG. 4) to range estimator 417 (FIG. 4). Step 1012 determines the time of flight between the transmitted and received pulses. Step 1014 estimates the distance of the object based on the time of flight. The method ends with step 1016.

In the description hereinabove, laser diodes transmit the pulse. However, other laser devices and well-focused light sources may be used. In addition, in the description hereinabove, photodiodes receive the pulse. However, other types of photoreceptors may be effectively used.

In an example embodiment, an integrated circuit includes a timing controller configured to select a selected time slot in a measurement period having a plurality of time slots, a transmit driver configured to provide a transmit signal in accordance with the selected time slot, in which the transmit signal is transmitted to an optical transmitter, and a range estimator configured to receive a received signal after the selected time slot from an optical receiver that is configured to receive a reflection of light transmitted by the optical transmitter off an object, the range estimator configured to determine an estimated distance of the object based on the received signal.

In another example embodiment, timing controller selects the selected time slot in accordance with an assignment signal provided by a common control.

In another example embodiment, the optical transmitter provides a pulse signal.

In another example embodiment, the optical transmitter provides a continuous wave signal and the range estimator determines the estimated distance of the object based on a phase difference between the continuous wave signal and the received signal.

In yet another example embodiment, timing controller selects the selected time slot based on an output of a pseudo-random number generator.

In another example embodiment, the range estimator determines if a collision has occurred by determining if the estimated distance is an outlier.

In another example, the timing controller selects the selected time slot based on time division multiplexing of the available time slots.

In another example embodiment, the optical transmitter is a laser emitting device.

In another example embodiment, the optical receiver is a photodiode.

In another example embodiment, an optical ranging apparatus includes a timing controller configured to select a selected time slot in a measurement period having a plurality of time slots, a transmit driver configured to provide a transmit signal in accordance with the selected time slot, in which the transmit signal is transmitted to an optical transmitter coupled to receive the transmit signal and to transmit a light signal onto an object, an optical receiver configured to receive a received signal after the selected time slot, the received signal including the light signal after reflecting off the object, and a range estimator coupled to the optical receiver, the range estimator configured to determine an estimated distance of the object based on the received signal.

In another example embodiment, the timing controller selects the selected time slot in accordance with an assignment signal provided by a common control.

In another example embodiment, the optical transmitter provides a pulse signal.

In yet another example embodiment, the optical transmitter provides a continuous wave signal and the range estimator determines the estimated distance of the object based on a phase difference between the continuous wave signal and the received signal.

In another example embodiment, the timing controller selects the selected time slot based on an output of a pseudo-random number generator.

In another example embodiment, the range estimator determines if a collision has occurred by determining if the estimated distance is an outlier.

In another example, the timing controller selects the selected time slot based on time division multiplexing of the available time slots.

In another example embodiment, the optical transmitter is a laser emitting device.

In another example embodiment, the optical receiver is a photodiode.

In another example embodiment, a method for operating an optical ranging apparatus includes providing a plurality of time slots in a measurement period, selecting a selected time slot for the optical ranging apparatus, driving an optical transmitter during the selected time slot to transmit a light signal, receiving a received signal at an optical receiver after the selected time slot that is the light signal reflected off an object to provide a received signal, comparing the light signal to the received signal to determine a time of flight, and estimating a distance of the object from the optical ranging apparatus using the time of flight.

In another example embodiment, the selected time slot is selected in accordance with an assignment signal provided by a common control.

In another example embodiment, the selected time slot is selected in accordance with a pseudo-random number generator.

In another example, the selected time slot is selected in accordance with time division multiplexing of the available time slots.

In another example embodiment, the light signal is a pulse.

Modifications are possible in the described embodiments, and other embodiments are possible, within the scope of the claims.

What is claimed is:

1. A method comprising:
   receiving, by a controller, a pseudo-random number from a pseudo-random number generator;
   selecting, by the controller, a time slot of a plurality of time slots responsive to the pseudo-random number;
   instructing, by the controller, a lidar optical transmitter to transmit a first signal during the time slot;
   receiving a second signal by an optical receiver after instructing the lidar optical transmitter to transmit the first signal during the time slot; and
   determining a distance responsive to the second signal.

2. The method of claim 1, wherein the lidar optical transmitter is a first lidar optical transmitter, a second time slot of the plurality of time slots is for a second lidar optical transmitter, and the method further comprising:
   receiving a third signal by the optical receiver;
   determining a first distance measurement responsive to the first signal and the second signal;
   determining a second distance measurement responsive to the first signal and the third signal; and
   determining the second signal is not a return signal of the second lidar optical transmitter responsive to at least one of the first or second distance measurements.

3. The method of claim 2, wherein determining the second signal is not a return signal of the second lidar optical transmitter responsive to at least one of the first or second distance measurements includes:
   determining a velocity responsive to the first distance measurement and the second distance measurement;
   comparing the velocity to a threshold; and
   responsive the velocity being below the threshold, determining that the second signal is not a return signal of the second lidar optical transmitter.

4. The method of claim 1, wherein the first signal is a continuous wave signal; and wherein determining the distance includes determining a phase difference between the first signal and the second signal.

5. The method of claim 4, wherein controlling the lidar optical transmitter to transmit the first signal during the time slot includes controlling the lidar optical transmitter to transmit the first signal throughout the time slot.

6. The method of claim 1, wherein the first signal is a pulse signal; and wherein determining the distance responsive to the second signal includes determining a time of flight between the first signal and the second signal.

7. The method of claim 1, further comprising:
   receiving an assignment signal indicating that the time slot is assigned to the lidar optical transmitter; and
   responsive to receiving the assignment signal, selecting the time slot.

8. The method of claim 1, wherein:
   the optical receiver is a first optical receiver; and
   the method further comprises receiving a copy of the first signal by a second optical receiver that proximate the lidar optical transmitter; and determining the distance responsive to the second signal includes determining the distance responsive to the second signal and the copy of the first signal.

9. A circuit comprising:
a timing controller configurable to:
select a first time slot of a plurality of time slots of a measurement period for a first lidar optical transmitter using a pseudo-random number generator, in which a second time slot of the plurality of time slots is to be selected for a second lidar optical transmitter;
a transmit driver configurable to control the first lidar optical transmitter to transmit a first signal during the first time slot;
a receiver configurable to receive a second signal; and
a range estimator configurable to:
responsive to determining that the second signal is not a return signal of the second lidar optical transmitter, determine a distance responsive to the second signal.

10. The circuit of claim 9, wherein the receiver is configurable to receive a third signal; and
wherein the range estimator is configurable to:
determine a first distance measurement responsive to the first signal and the second signal;
determine a second distance measurement responsive to the first signal and the third signal; and
determine that the second signal is not a return signal of the second lidar optical transmitter responsive to at least one of the first or second distance measurements.

11. The circuit of claim 10, wherein the range estimator is configurable to:
determine a velocity responsive to the first distance measurement and the second distance measurement;
compare the velocity to a threshold; and
responsive to the velocity being below the threshold, determine that the second signal is not a return signal of the second lidar optical transmitter.

12. The circuit of claim 9, wherein the transmit driver is a lidar driver, and the first signal and the second signal are light signals.

13. The circuit of claim 12, wherein the lidar driver is a laser emitting device.

14. The circuit of claim 12, wherein the receiver includes a photodiode.

15. The circuit of claim 9, wherein the first signal is a continuous wave signal, and the range estimator is configurable to determine the distance responsive to a phase difference between the first signal and the second signal.

16. The circuit of claim 9, wherein the first signal is provided throughout the first time slot.

17. The circuit of claim 9, wherein the first signal is a pulse signal and the range estimator is configurable to determine the distance responsive to a time of flight between the first signal and the second signal.

18. A method comprising:
instructing, by a controller, a first lidar optical transmitter to transmit a first signal;
receiving, by an optical receiver, a second signal;
determining that the second signal is not a return signal of a second lidar optical transmitter, comprising:
receiving a third signal by the optical receiver;
determining a first distance measurement responsive to the first signal and the second signal;
determining a second distance measurement responsive to the first signal and the third signal;
determining a velocity responsive to the first distance measurement and the second distance measurement; and
responsive to the velocity being below a threshold, determining that the second signal is not a return signal of the second lidar optical transmitter; and
responsive to determining that the second signal is not a return signal of the second lidar optical transmitter, determining a distance responsive to the second signal.

19. The method of claim 18, further comprising receiving, by the controller from a computer, a first time slot of a plurality of time slots of a measurement period, in which a second time slot of the plurality of time slots is for the second lidar optical transmitter, and wherein instructing the first lidar optical transmitter to transmit the first signal comprises instructing the first lidar optical transmitter to transmit the first signal during the first time slot.

* * * * *